United States Patent [19]

Blackman et al.

[11] Patent Number: 5,414,643
[45] Date of Patent: May 9, 1995

[54] METHOD AND APPARATUS FOR CONTINUOUS TIME REPRESENTATION OF MULTIPLE HYPOTHESIS TRACKING DATA

[75] Inventors: Samuel S. Blackman; Robert J. Dempster, both of Los Angeles, Calif.

[73] Assignee: Hughes Aircraft Company, Los Angeles, Calif.

[21] Appl. No.: 77,165

[22] Filed: Jun. 14, 1993

[51] Int. Cl.⁶ ............................................. G06F 15/20
[52] U.S. Cl. ....................................... 364/516; 342/95
[58] Field of Search ................ 364/516, 514; 395/143; 358/108; 342/95

[56] References Cited

U.S. PATENT DOCUMENTS

| | | | |
|---|---|---|---|
| 4,855,932 | 8/1989 | Congiani et al. | 364/516 |
| 5,036,474 | 7/1991 | Bhanu et al. | 364/516 |
| 5,128,684 | 7/1992 | Brown | 364/516 |
| 5,170,440 | 12/1992 | Cox | 395/143 |
| 5,233,541 | 8/1993 | Corwin et al. | 364/516 |
| 5,315,538 | 5/1994 | Borrell et al. | 364/516 |
| 5,325,098 | 6/1994 | Blair et al. | 342/95 |

OTHER PUBLICATIONS

Roecker; "Track monitoring when tracking with multiple 2-D passive sensors." IEEE 1991.
Bath; "Use of multiple hyposthesis in Radar tracking." IEEE Oct. 12-13, 1992.
Multiple-Target Tracking with Radar Application (Samuel S. Blackman) Artech House (1986).

Primary Examiner—Ellis B. Ramirez
Attorney, Agent, or Firm—Georgann S. Grunebach; Wanda K. Denson-Low

[57] ABSTRACT

A multiple hypothesis tracking system (10) which generates a substantially continuous output to a system user. The multiple hypothesis tracking system (10) generates a primary set of tracks (12) which best represents the expected number of targets of interest in a cluster. For multiple sensor applications, a secondary set of tracks is generated having a less probability than the tracks in the primary set. A knowledge of track data is maintained from one scan to a subsequent scan such that tracks can be merged and deleted (14). A universal track file (16) is generated in which track associations from one scan to a subsequent scan are correlated such that the output of the track file remains consistent with respect to the number of tracks.

24 Claims, 3 Drawing Sheets

METHOD AND APPARATUS FOR CONTINUOUS TIME REPRESENTATION OF MULTIPLE HYPOTHESIS TRACKING DATA

BACKGROUND OF THE INVENTION

1. Field of the Invention

This invention relates generally to a multiple hypothesis tracking system for tracking multiple targets and, more particularly, to a multiple hypothesis tracking system for tracking multiple targets which provides a continuous output to a user.

2. Discussion of the Related Art

Ground based and air based tracking systems for acquiring and tracking certain moving targets of interest such as aircraft and land vehicles are known in the art. These target acquisition systems acquire and track targets and present them to a system user such as a pilot or systems operator. Various phenomena, such as background clutter from superfluous objects in an image scene typically reduce the inherent reliability of the system because of a higher probability of missed target detection and/or false target detection. These errors become increasingly serious for tracking systems which must track a multitude of targets simultaneously.

One particular applicable tracking system known in the art is a multiple hypothesis tracking (MHT) system. An MHT system generates sequential outputs to a user by sensing a field of view, typically in a scanning motion. The user output is an image of a scene which includes a number of objects, some of which may be targets of interest. Tracks of potential targets are generated from sequential scans where each track consists of a set of observations taken over time in which clusters of potential targets in an observation are specified as hypotheses. By correlating one target in one observation with a target in a subsequent observation, it is possible to generate a track of the target as an object of interest as it travels through the scene. An output of the MHT system may include multiple data association hypotheses that potentially consist of several tracks on the same target. For an overview of MHT systems, see S. S. Blackman, "Multiple-Target Tracking With Radar Application," Artech House, Inc.,1986, herein incorporated by reference.

Once the MHT system generates the observations and develops a track of the particular objects of interest in the observations, a problem then arises as to how to present this information to the user. As the MHT system continually provides new observations, the particular tracks being updated by the system is constantly changing as new hypotheses are formed and as tracks are split, merged and deleted due to the movement of the hypotheses. Thus, at any given time there may be two or more hypotheses that will differ in regard to the number of targets present in the state vectors of the tracks representing the targets. And therefore, a potential discontinuity in the number of tracks associated with a given target exists. In this regard, the direct output of an MHT system may be difficult to interpret on the system display or to use to perform track-to-track association in a multiple sensor tracking system.

What is needed then is an MHT system which provides a continuous output from the MHT system which can be conveniently utilized by either an operator or a multiple sensor track-to-track association routine. It is therefore an object of the present invention to provide such a system.

SUMMARY OF THE INVENTION

Disclosed is an MHT system which generates sequential images of a scene by a sensing mechanism such as radar or infrared, and establishes clusters of interacting tracks. According to a preferred embodiment of the present invention, these tracks are partitioned into hypotheses containing sets of non-interacting tracks, i.e., tracks that do not share common observations. Each hypothesis is assigned a particular probability that the hypothesis contains valid target tracks. The probability of a given track is the sum of probabilities of all the hypotheses that contain the track. The expected number of targets within the cluster is formed by summing the track probabilities.

Once the probabilities of the hypotheses are determined, a primary track is formed for each perceived target in the scene. Primary tracks are those tracks that currently best represent the expected number of targets in a cluster. This set of primary tracks is used to form a universal track file such that the same universal track number on a given target will be maintained throughout an encounter scenario. Track branching and merging is continually being performed during the tracking process. The primary track is then displayed to the user of a single sensor tracking system or combined with the primary tracks from other sensors in a multiple sensor tracking system in order to form a multiple sensor track file. A secondary track set may be defined so that a multiple sensor track-to-track association history over several scans can be established for tracks from different sensors.

Additional objects, advantages, and features of the present invention will become apparent from the following description and appended claims, taken in conjunction with the accompanying drawings.

DETAILED DESCRIPTION OF THE PREFERRED EMBODIMENT

The following discussion of the preferred embodiments concerning a multiple hypothesis tracking system is merely exemplary in nature and is in no way intended to limit the invention or its application or uses.

Figure 1:
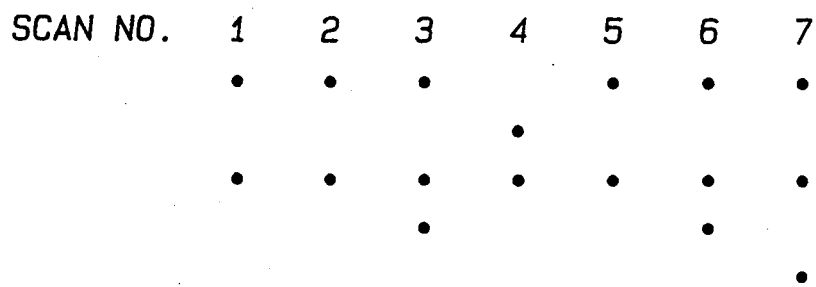
FIGS. 1-9 are diagrams of sequential scans including detect objects and probable tracks.

In order to get an understanding of how the MHT system of the invention tracks multiple targets and presents a continuous output to a system user, it is first important to get an understanding of how an appropriate sensor may generate observations of a scene and how detected objects in the observations are developed into tracks. Typically, the sensor will scan a field of view in a manner well understood to those skilled in the art. Turning to FIG. 1, a series of seven scans is shown in which either two or three detected objects are displayed for each scan. In other words, the black dots in vertical alignment with the scan numbers represent different detected objects, such as aircraft, background objects, or clutter, which have been sensed by the sensor. By considering successive scans as shown, an MHT system will attempt to combine the different objects and generate track hypotheses as specific targets of interest.

Figure 2:
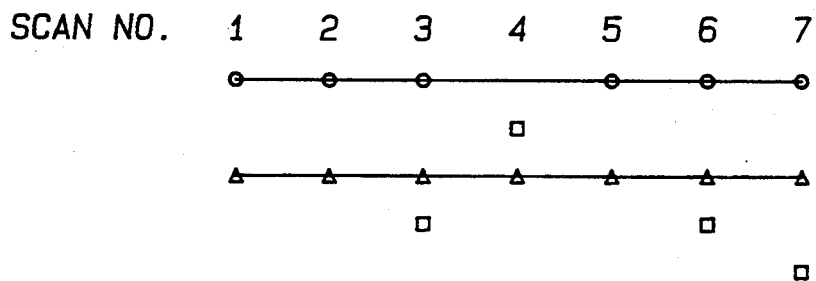
Figure 3:
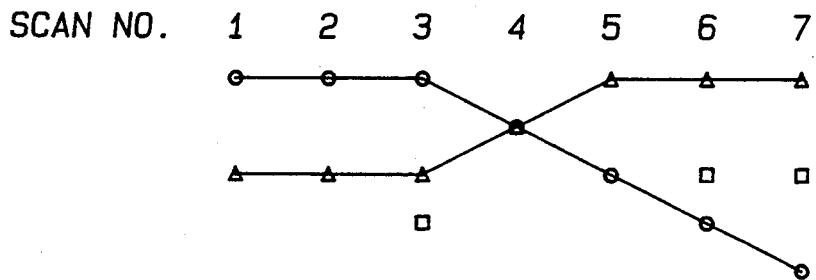

FIG. 2 shows one of either a circle, a triangle or a square representation for each of the objects shown in FIG. 1. An MHT system may determine that the circles are one object of interest, such as an aircraft, and the triangles are another object of interest, and develop tracks of these objects over successive scans as shown. The squares may be determined to be background clutter. Note that at scan 4 there is a circle missing indicating that a detection did not take place. FIG. 3 shows an alternate interpretation of the dots of FIG. 1 where a second set of tracks of the circles and triangles could be established by an MHT system. In this example, the tracks of the objects cross and separate. Potential tracks are formed into hypotheses. For example, FIGS. 2 and 3 both represent hypotheses containing two tracks. A set of potential tracks which share common detections is a cluster. There can be many hypotheses within a cluster.

Figure 4:
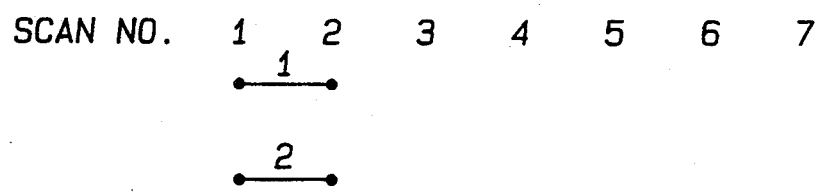
Figure 5:
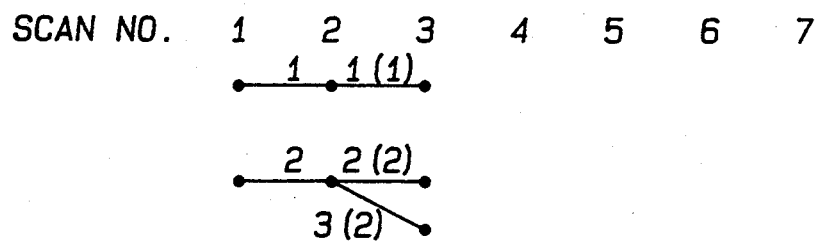
Figure 6:
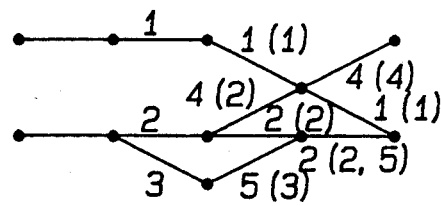
Figure 7:
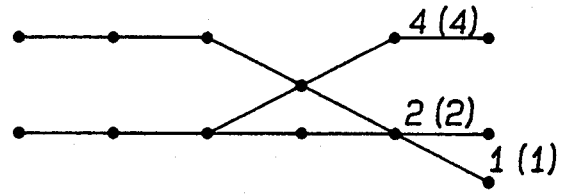
Figure 8:
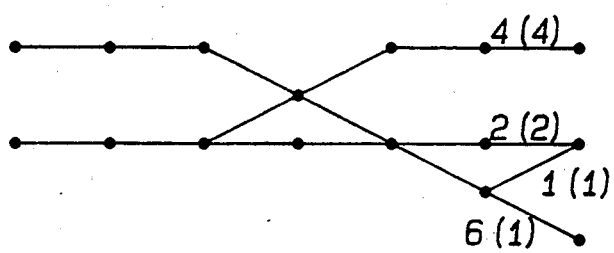

FIGS. 4-8 show the manner in which the object dots of FIG. 1 can be connected in order to establish a number of possible alternative tracks where each potential track may be numbered after each scan in a manner consistent with the MHT logic. As the MHT system develops the different tracks from the history of one scan to the next, each track is assigned a particular number. In these figures, the detected objects as shown in FIG. 1 are developed successively. Specifically, in FIG. 4, only the scans 1 and 2 are shown, and as such, two potential tracks 1 and 2 are so labelled. In FIG. 5, scans 1, 2 and 3 are shown in which the tracks as were developed in FIG. 4 are labelled with the same track number and with the previous track number in parentheses. Additionally, a potential third track is shown with its previous track number also shown in parentheses. In FIG. 6, scans 1-5 are shown and the potential tracks are labelled according to predetermined logic. As with FIG. 5 above, the track numbers are shown with the previous track number in parentheses. Some tracks may include more than one previous track number in that potential tracks may be merged causing multiple ancestor tracks. In FIG. 7, the potential tracks have been narrowed to three after the sixth scan. After all seven consecutive scans have been developed, as shown in FIG. 8, four potential tracks are labelled. The universal track numbers shown in FIG. 9 result from a correlation of the tracks with their respective track numbers from preceding scans with the primary tracks and their predecessors. In this figure the numbers in parentheses refer to the corresponding MHT track number that were chosen as universal tracks.

Figure 9:
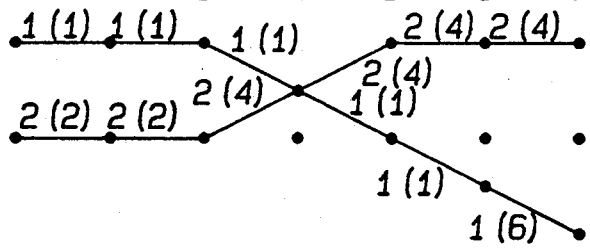

The potential tracks shown in FIGS. 4-8 are maintained internal to the MHT system. There are typically more potential tracks maintained than actual targets present. The universal track file shown in FIG. 9 is a composite of the most likely tracks as computed at each data scan. It gives the user a continuous representation of the most likely target data at each scan.

The scans of FIGS. 1-9 above are relatively simple in nature. It is fairly easy to imagine that many additional tracks in association with many clutter points where the tracks are crossing would result in a substantial problem of sorting out the tracks to present them to a user.

Figure 10:
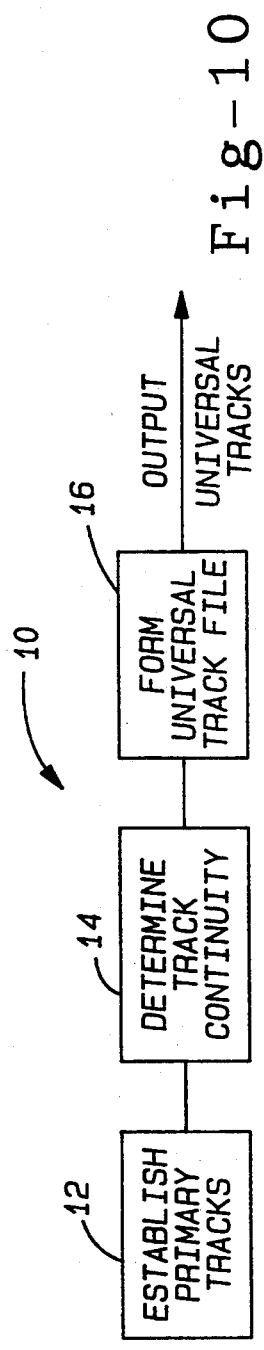
FIG. 10 is a functional block diagram of an MHT system according to a preferred embodiment of the present invention.

FIG. 10 shows a block flow diagram 10, according to a preferred embodiment of the present invention, for presenting a universal track file to a user in a single sensor application such that the universal track file remains consistent through an encounter scenario. As represented by box 12, the first step is to establish a first set of tracks. The members of the first set of tracks are defined to be primary tracks, where the number of primary tracks is equal to the number of targets in the cluster. A cluster is a set of tracks which share common detections. Since the computed expected number of targets in the cluster may not be an integer, the number is rounded off to the nearest integer defined to be $N_T$.

In order to establish the primary tracks, it is first necessary to identify the detections in the scans and predict gates for subsequent scans based on the state vectors of position, velocity and acceleration of the hypotheses in the previous scans. Next, those sequences of detections which meet specified track initiation rules as developed by the MHT logic are selected. One specific example would be to select the sequence of detections which were expected on four out of five successive scans. The above track initiation steps are determined by the nature of the targets and the background.

Once the track initiation has been performed, the MHT system would maintain all feasible tracks from scan to scan using appropriate MHT rules. In other words, the prediction in gating of the tracks would be used to propagate tracks with appropriate track deletion rules. Once the tracks have been established, the next step is to determine a probability and score for each track that the track is an object of interest. This probability is based on detection and false track probabilities. A track score (L) is computed recursively and the track probability (P) is computed from the score via the following recursive relationship:

$$L(1) = \ln[\hat{\beta}_{NT}/\hat{\beta}_{FT}]$$

For $k > 1$, the score is updated from the relationship, $$L(k+1) = \begin{array}{l} L(k) + \Delta L_G; \text{ detection received} \\ L(k) + \Delta L_L; \text{ detection not received} \end{array}$$

where, $$\Delta L_G = \ln\left[\frac{\hat{P}_D}{\hat{\beta}_{FT}(2\pi)^{M/2}\sqrt{|S|}}\right] - d^2/2;$$

$$\Delta L_L = \ln[1 - \hat{P}_D];$$

M = measurement dimensionality;
|S| = determinant of the residual covariance matrix;
$\beta_{FT}$ = estimated false target (false alarm) density;
$P_D$ = estimate of the probability of detection; and
$\beta$ = estimated new target density.

The track probability is:

$$P = \text{EXP}(L)/[1 + \text{EXP}(L)]$$

There are a number of ways in which primary tracks may be selected. One approach would be to chose the $N_T$ highest probability tracks of the most likely hypothesis. A second, more desirable approach, includes finding the highest probability track within the cluster. A tie between two or more probabilities, such as would occur when more than one track has probability 1.0, can be broken in any known manner. This highest probability track is used to form a primary track cluster. If $\hat{N}_T \geq 2$, then the second step is to find the highest probability track that remains which is compatible with the tracks in the primary track cluster. If this second track has a probability greater than a certain minimum value $P_{MIN}$, then it is added to the cluster. In a preferred embodiment, a value of 0.5 for $P_{MIN}$ has been determined as a minimum value. If the number of tracks in the cluster is less than $\hat{N}_T$, the second step is repeated. If there is no track that satisfies this criterion, then a third step is to add the remaining track with the highest probability to the primary track cluster. This third step is repeated until the number of tracks in the primary track cluster equals $\hat{N}_T$. Finally, the second and third steps above are repeated until $\hat{N}_T$ tracks are chosen as primary tracks for the given cluster. The above determination of the primary tracks would be performed for each cluster. Tracks that do not have common detections will belong in different clusters. If a track has no detections in common with any other track, then it is not clustered.

As represented by box 14, once the primary tracks have been established, the next step is to determine track continuity from one scan to the next. Track branching and merging operations are continually being performed during the tracking process. In this regard, the MHT track number that best represents a given target may continually change. Therefore, in order to establish a continuous output, each track's previous track (or ancestor) number is maintained by the MHT logic and is represented in the output by its previous track number in association with the current track number. Multiple prior tracks may be possible predecessors of a current track hypothesis.

Table I below shows a current list of primary and secondary track numbers for a particular cluster where the previous track number is represented in parentheses adjacent the current track number. The secondary track numbers are those tracks which have a probability less than the track numbers in the primary track numbers. The secondary track set has application for multiple sensor applications as will be discussed below. Since the estimated number of targets is 10, there are 10 primary tracks. All of the primary tracks except for track number 2 have changed track number since the last scan. Track merging offers a problem in maintaining a continuous track history.

TABLE I

| Primary and Secondary Tracks for a Scan n | |
|---|---|
| Primary Tracks | Secondary Tracks |
| 62(152) | 136(27) |
| 2(2) | 81(30) |
| 133(61) | 50(10) |
| 115(144) | 95(95) |
| 59(92) | 82(129) |
| 41(95) | 146(92,129) |
| 69(27) | 11(30) |
| 35(126) | 8(10) |
| 109(90) | 71(42) |
| 121(129) | |

Track merging is a major part of the logic designed to keep the number of tracks in a hypothesis under control. Tracks which contain the same recent observations, or that have very similar state vectors, are probably redundant tracks on the same target and can be merged by dropping the lower probability track, but keeping the knowledge of the prior tracks from both tracks. Therefore, based upon observation history and state vector difference tests, similar tracks are identified for merging. Given a set of two or more tracks to be merged, an MHT merging process maintains the most likely track and deletes all others in the set.

For an example of track merging, define T1 (T3) as track T1 with an ancestor track T3, and T2 (T4) as track T2 with an ancestor track T4. Then, assuming that T1 and T2 are merged with the result that T1 survives, T1 must also assume T4, as well as T2, as an ancestor, otherwise, the history of T4 will be lost. Thus, there may be more than one track in the ancestor list (for primary, as well as secondary tracks). The ancestry list only includes those tracks that were previously transmitted as either primary or secondary tracks. In the case that a primary track has no such ancestor from the previous scan, an asterisk is placed in the ancestor list.

Once track continuity is performed, the next step, as represented by box 16, is to formulate a universal track file. The universal track file defines a list of MHT tracks that, at any given time, best represent the expected number of targets in the field of view. The universal track list is formed from primary tracks, and continuity is provided by the track-to-track association logic. The best current primary tracks are used to form the universal track list. The universal track list is updated at each scan through a process of choosing the best primary tracks that are then used to form a new universal track list. In this implementation, no track fusion is required.

Assume that a universal track file is formed for a scan $n-1$ and that position and velocity are predicted ahead to scan n. Also, the number of the MHT primary tracks that were used to form the universal track on the last scan $n-1$ is saved. Now, a new set of MHT primary tracks is received, and a universal to MHT primary track-to-track association is performed in the following manner.

First, MHT primary and universal tracks that have the same ancestor primary tracks on a previous scan $n-1$ are associated. If more than one MHT primary track has the same ancestor track, the closest MHT primary track is associated to the universal track. Distance is measured by forming a normalized statistical distance using the position and velocity differences between the primary and the universal tracks and their associated covariances, as is well known in the art. This first step will remove a set of universal and MHT primary tracks from the correlation process.

Next, for all of the remaining universal and MHT primary tracks, a normalized statistical distance is used to perform standard gating and assignment logics is computed, in a manner as is also well known in the art. For this scan, a moderately sized gate based upon chi-square statistics is chosen. For example, for an infrared system using two angles and two angle rates for association, a typical gate value is thirteen (13).

Next, after the first two steps above are performed, there may still be some universal and some primary tracks that are unpaired. Therefore, a "last resort" correlation logic is also performed. The last resort correlation logic looks for unpaired universal and primary text that have the same origin (parent track number and scan). Then, if any previously unpaired primary and universal tracks satisfy this condition, a second gate test with a larger gate value is used to test potential pairings.

All unpaired primary tracks are used to establish new universal tracks. The universal track file state estimate will, at any given time, be the state estimate associated with the last MHT primary track that was used to form the universal track. The state vector is extrapolated until a new primary track is used to replace the old universal track. A simple drop logic is defined so that the universal track that is not assigned to an MHT primary track for $N_D$ consecutive scans is deleted. A typical value for $N_D$ is 4.

The universal track file is the main output from the MHT. It can be presented after each scan of data is received or during intermediate times. It will be the output to a user, and it can be used as a comparison with truth in an evaluation of tracking system performance.

To illustrate, Table II shows a universal track list for the scan depicted in Table I. This track list shows a track score and the scan at which the numbered track was initiated. Additionally, the "+" indicates track confirmation. All of the current universal tracks except tracks 1, 10 and 11 are direct descendants of universal tracks from the previous scan. Current universal tracks 1 and 10 were linked with the previous universal tracks by a distance association. New universal track 11 is added to the list because universal track 5 failed to associate with any current primary track. The last time the universal track 5 was associated with a current primary track was on scan 16, so that this universal track is one miss short of deletion.

Table III shows the universal track list for the next scan. Universal track 5 has been deleted because four consecutive associates have been missed. Also, the score of universal track 11 has now exceeded the confirmation threshold. This example illustrates the manner in which a nearly continuous output is achieved even though a track loss and later reinitialization occurred.

TABLE II

Universal Trackfile for Scan n

| Track No. | Track Score | Initiation Time | Last Primary | Current Primary | Track Position AZ | EL |
|---|---|---|---|---|---|---|
| 1+ | 169.858 | 1 | 10 | 109 | 68.4 | 212.4 |
| 2+ | 174.875 | 1 | 2 | 2 | 67.5 | 199.6 |
| 3+ | 161.141 | 1 | 61 | 133 | 68.1 | 210.2 |
| 4+ | 168.950 | 1 | 95 | 41 | 68.5 | 205.4 |
| 5+ | 135.519 | 1 | 13 | 13 | 69.8 | 192.4 |
| 6+ | 167.617 | 1 | 27 | 69 | 68.1 | 203.3 |
| 7+ | 169.394 | 1 | 129 | 121 | 67.6 | 204.0 |
| 8+ | 171.086 | 1 | 152 | 62 | 68.1 | 218.5 |
| 10+ | 176.833 | 1 | 30 | 35 | 67.8 | 213.8 |
| 11+ | 8.468 | 19 | 0 | 115 | 67.6 | 215.7 |

TABLE III

Universal Trackfile for Scan n + 1

| Track No. | Track Score | Initiation Time | Last Primary | Current Primary | Track Position AZ | EL |
|---|---|---|---|---|---|---|
| 1+ | 180.822 | 1 | 109 | 111 | 70.1 | 211.7 |
| 2+ | 184.795 | 1 | 2 | 2 | 69.1 | 200.2 |
| 3+ | 171.939 | 1 | 133 | 30 | 70.5 | 210.2 |
| 4+ | 178.339 | 1 | 41 | 41 | 70.6 | 204.8 |
| 5 | ******* | Track | Has | Been | Deleted | ****** |
| 6+ | 172.084 | 1 | 69 | 89 | 70.5 | 202.2 |
| 7+ | 180.106 | 1 | 121 | 43 | 69.7 | 205.4 |
| 8+ | 179.013 | 1 | 62 | 107 | 70.2 | 217.5 |
| 9+ | 167.841 | 1 | 59 | 59 | 69.6 | 208.4 |
| 10+ | 186.630 | 1 | 35 | 20 | 70.2 | 214.0 |
| 11+ | 16.295 | 19 | 115 | 98 | 69.7 | 216.0 |

Figure 11:
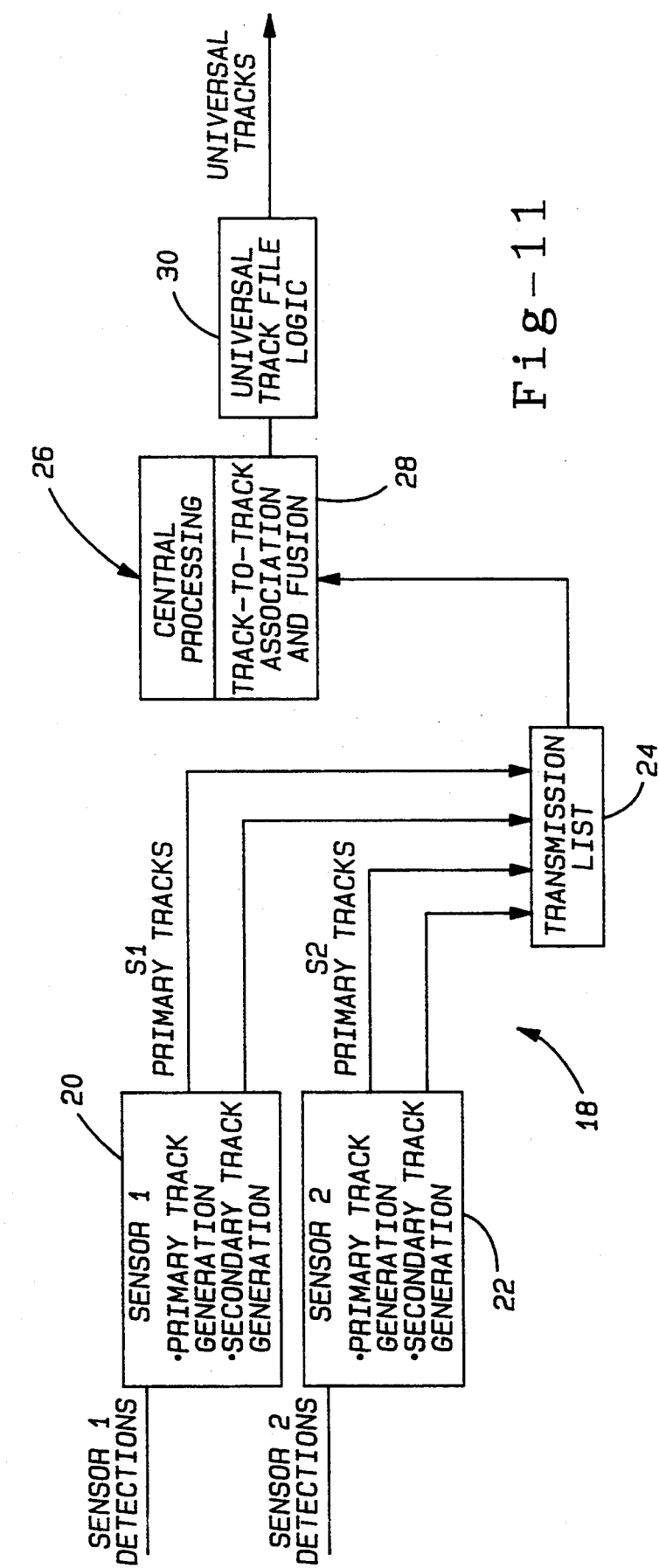
FIG. 11 is a functional block diagram for a multi-sensor application of an MHT system according to a preferred embodiment of the present invention.

The above described system also has application for multi-sensor tracking. FIG. 11 shows a flow block diagram 18 for a multi-sensor tracking system. A standard approach for the multi-sensor tracking problem is for each sensor in a multi-sensor system to establish track files formed by its own measurements. As represented by boxes 20 and 22 of the system 18, a first and second sensor establish a set of primary tracks in the manner as discussed above for the box 12. Additionally, as will be discussed below, each of the MHT systems for the particular sensors generate a secondary track file. The primary and secondary tracks from each of the sensors are applied to a transmission list, as represented by box 24, for combining the tracks. The list is outputed to a central processing system 26. At the central processing system 26, track-to-track association, as represented by box 28, is performed such that data from the different sensors are associated in order to determine which MHT tracks from the different sensors represents the same set of objects. In order to form a multi-sensor, or global, track file, tracks from the individual sensors must be associated and track fusion performed. This association process should ideally be performed by comparing track histories over multiple scans.

Due to the dynamic manner in which MHT track probabilities change in a difficult tracking environment, the multiple sensor track-to-track association matrices should contain all potentially feasible tracks output from the MHT system. Thus, in addition to the primary tracks described above, a set of secondary tracks is also identified and transmitted from the sensor to the central level for association with the tracks from other sensors. The secondary tracks do not form global tracks at the current time, but decedents of the secondary tracks may later become primary tracks. Thus, the purpose of transmitting secondary tracks is so that a multi-sensor track association history can be established for potential later global track formation. The logic for determining secondary tracks will be described below.

Once primary tracks are chosen, there will remain a pool of tracks in each cluster from which secondary tracks may be chosen. The first rule is to choose all tracks for which the a posteriori probability exceeds the sum of a minimum value, such as $P_{MIN}$. A typical value for $P_{MIN}$ in this application is 0.03.

The next step for choosing secondary tracks is that all previously transmitted tracks should be continued, if a continuation exists. To provide this continuation, the following steps may be employed.

First, a list of all tracks, both primary and secondary, is maintained that were transmitted on the previous scan. This list will be referred to as the transmitted track list. Next, the ancestors of the primary tracks and the previously identified secondary tracks are determined. These ancestor tracks are removed from the transmitted track list. Next, for each track that remains on the transmitted track list, it is determined if there are any descendent tracks in the cluster pool. If so, for a given previously transmitted track, the highest probability descendent track to the secondary track list is added and the previously transmitted track from the transmitted track list is removed. In order to maintain continuity, the logic is designed so that, whenever possible, a descendent track will be transmitted for each previously transmitted track. However, there will be some transmitted tracks that have no surviving decedents. This occurs because unlikely tracks are deleted and is desirable so that the transmission is not excessive.

Once a global, or multi sensor, track file is formed, a set of primary tracks is chosen to represent the perceived number of targets. Then, the output from the central processing system 26 is applied to the universal track file logic processing stage, as represented by box 30, for processing as previously described in the manner described above for establishing the universal track file.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention as defined in the following claims.

What is claimed is:

1. A method of tracking objects comprising the steps of:
   generating a sequence of scans of a scene in which each scan includes a number of detections of potential targets;
   establishing a set of primary tracks from a pool of potential targets, wherein a primary track includes the highest probability tracks within a particular cluster of the potential targets, each track being assigned a track number;
   maintaining a running knowledge of the track numbers of previous scans which led to the assignment of the track numbers of a current scan;
   eliminating redundant tracks by merging and deleting lower probability tracks;
   generating a universal track file which contains a set of tracks that best represents the expected number of targets in the scene; and
   outputting the universal track file to a system user.

2. The method according to claim 1 wherein the step of establishing a set of primary tracks includes determining the probability for each potential track and determining the highest probability track based on detection and false set probabilities.

3. The method according to claim 2 wherein the step of establishing a primary track includes the steps of determining which of the remaining tracks has a highest probability until the number of tracks in the cluster is equal to the number of targets in a cluster containing the tracks.

4. The method according to claim 1 wherein the step of establishing the set of primary tracks includes determining the highest probability track above a predetermined threshold which remains from the set of tracks until the track hypotheses is greater than two.

5. The method according to claim 1 wherein the step of establishing a set of primary tracks is performed for each cluster.

6. The method according to claim 1 wherein the step of generating the universal track file includes eliminating an universal track with no detections for a predetermined number of successive scans.

7. The method according to claim 1 wherein the step of generating a universal track file includes updating the universal track file after each scan by selecting the higher probability primary tracks.

8. The method according to claim 1 further comprising the step of applying last resort correlation logic for pairing primary tracks and the universal track file.

9. The method according to claim 1 further comprising the step of establishing a set of secondary tracks in which the secondary tracks have a lower probability of being targets than the set of primary tracks.

10. The method according to claim 9 wherein the step of generating the secondary tracks is based on the tracks with the highest probability of the remaining tracks after the primary tracks have been determined.

11. The method according to claim 1 wherein the step of establishing a set of primary tracks is performed at multiple sensor applications, and each set of primary tracks from each sensor is applied to a central processing system for associating common tracks from each sensor for track fusion.

12. The method according to claim 11 wherein an output from the central processing system is applied to a universal track file system for generating a universal track file for each of the sensors.

13. A multiple hypothesis tracking system for tracking multiple targets in a scene, said system comprising:
    means for generating a sequence of scans of the scene in which each scan includes a number of detections of potential targets;
    primary track generating means for generating a set of primary tracks from a pool of potential targets from the means for generating, wherein a primary track includes the highest probability tracks within a particular cluster of the potential targets, each primary track being assigned a track number, said primary track generating means maintaining a running knowledge of the track numbers of previous scans which led to the assignment of the track numbers of a current scan;
    track merging means for eliminating redundant tracks by merging and deleting lower probability tracks;
    universal track file means for generating a universal track file which contains a set of tracks that best represents the expected number of targets in a scene, and
    outputting means for outputting the universal track file to a system user.

14. The multiple hypothesis tracking system according to claim 13 wherein the primary track generating means includes means for determining the probability for each potential track and determining the highest probability track based on detection and false set probabilities.

15. The multiple hypothesis tracking system according to claim 14 wherein the primary track establishing means includes means for determining which of the remaining tracks has a highest probability until the number of tracks in the cluster is equal to the number of targets in a cluster containing the tracks.

16. The multiple hypothesis tracking system according to claim 13 wherein the primary track generating means includes means for determining the highest probability track above a predetermined threshold which remains from the set of tracks until the track hypotheses is greater than two.

17. The multiple hypothesis tracking system according to claim 13 wherein the primary track generating means generates the set of primary tracks for each cluster.

18. The multiple hypothesis tracking system according to claim 13 wherein the universal track file generating means includes means for eliminating a universal track with no detections for a predetermined number of successive scans.

19. The multiple hypothesis tracking system according to claim 13 wherein the universal track file generating means includes means for obtaining the universal track file after each scan by selecting the higher probability primary tracks.

20. The multiple hypothesis tracking system according to claim 13 further comprising last resort correlation logic means for pairing primary tracks and the universal track file.

21. The multiple hypothesis tracking system according to claim 13 further comprising secondary track generating means for generating a set of secondary tracks in which the secondary tracks have a lower probability of being targets than the set of primary tracks.

22. The multiple hypothesis tracking systems according to claim 21, wherein the secondary track generating means generates the secondary tracks based on the tracks with the highest probability of the remaining tracks after the primary tracks have been determined.

23. The multiple hypothesis tracking system according to claim 13 wherein the primary track generating means establishes a set of primary tracks from multiple sensors, wherein each set of the primary tracks from each sensor is applied to a central processing system for associating common tracks from each sensor for track fusion.

24. The multiple hypothesis tracking system according to claim 23 wherein an output from the central processing system is applied to a universal track file system for generating a universal track file for each of the sensors.

* * * * *